US005505928A

United States Patent [19]

Alivisatos et al.

[11] Patent Number: 5,505,928
[45] Date of Patent: * Apr. 9, 1996

[54] PREPARATION OF III-V SEMICONDUCTOR NANOCRYSTALS

[75] Inventors: A. Paul Alivisatos, Berkeley, Calif.; Michael A. Olshavsky, Brunswick, Ohio

[73] Assignee: The Regents of University of California, Oakland, Calif.

[*] Notice: The portion of the term of this patent subsequent to Jan. 16, 2010, has been disclaimed.

[21] Appl. No.: 231,345

[22] Filed: Apr. 21, 1994

Related U.S. Application Data

[63] Continuation of Ser. No. 796,246, Nov. 22, 1991, abandoned.

[51] Int. Cl.$^6$ ............................ C01B 25/00; C22C 21/00
[52] U.S. Cl. ........................ 423/299; 420/528; 420/555; 420/576; 420/577; 423/289; 423/290
[58] Field of Search ...................................... 423/299, 290, 423/289; 420/528, 555, 576, 579

[56] References Cited

U.S. PATENT DOCUMENTS

| | | | |
|---|---|---|---|
| 4,250,205 | 2/1981 | Constant et al. | 156/613 |
| 4,594,264 | 6/1986 | Jensen | 420/579 |
| 4,798,701 | 1/1989 | David | 423/299 |

OTHER PUBLICATIONS

Olshavsky et al, Organometallic Synthesis of GaAs Crystallites Exhibitions Quantum Confinement, J. American Chemical Society, 1990, 112, pp. 9438–9439.
Henglein, *Top. Curr. Chem.* (1988) 143:113–180.
Brus, *J. Phys. Chem.* (1986) 90:2555–2560.
Brus, *IEEE J. J. Quantum Electron* (1987) QE–22:1909–914.
Shiang et al., *J. Chem. Phys.* (1990) 92:3232–3233.
Alivisatos et al., *J. Chem.* (1988) 89:4001–4011.
Alivisatos et al., *J. Chem. Phys.* (1989) 90:3463–3468.
Alivisatos et al., *J. Chem. Phys.* (1988) 89:5979–5982.
Brus, *J. Chem. Phys.* (1983) 79:5566–5571.
Schmitt–Rink et al., *Phys. Rev. B* (1987) 5:8113–8125.
Miller et al., *Phys. Rev. B.* (1986) 33:6976–6982.
Miller et al., *Applied Phys. Letters* (1988) 52:2154–2156.
Sandroff et al., *Science* (1988) 245:391–393.
Byrne et al., *Science* (1988) 241:332–334.
Wells et al., *Chem. Mater.* (1989) 1:4–6.
Wells et al., *Mater. Res. Soc. Proc.* (1989) 131:45–50.

*Primary Examiner*—Gary P. Straub
*Attorney, Agent, or Firm*—Paul Martin

[57] ABSTRACT

Nanometer-scale crystals of III–V semiconductors are disclosed, They are prepared by reacting a group III metal source with a group V anion source in a liquid phase at elevated temperature in the presence of a crystallite growth terminator such as pyridine or quinoline.

25 Claims, 2 Drawing Sheets

PREPARATION OF III-V SEMICONDUCTOR NANOCRYSTALS

REFERENCE TO GOVERNMENT SUPPORT

This invention was made with Government support under Contract No. DE-AC04-76SF00098 between the United States Department of Energy and the University of California for the operation of Lawrence Berkeley Laboratory. The Government has rights in this invention.

This application is a continuation of application Ser. No. 07/796,246, filed Nov. 22, 1991, and now abandoned.

BACKGROUND OF THE INVENTION

1. Field of the Invention

This invention concerns II–IV-type semiconductor crystals having nanometer dimensions and a process for their production.

2. Background Art

The optical spectra of semiconductor crystallites whose dimension is comparable to the bulk exciton diameter show quantum confinement effects. Henglein, A., *Top. Curr. Chem.* (1988) 143:113–180; Brus, L. E., *J. Phys. Chem.* (1986) 90:2555; Brus, L. E., IEEE *J. Quantum Electron* (1987) QE-22:1909; Shiang, J. J. et al., *J. Chem. Phys.* (1990) 92:3232; Alivisatos, A. P. et al., *J. Chem Phys.* (1988) 89:4001; Alivisatos, A. P. et al., *J. Chem. Phys.* (1989) 90:3463; Alivisatos, A. P. et al., *J. Chem. Phys.* (1988) 89:5979. To date, experimental studies of nanometer-size crystallites have been restricted to II–VI and I–VII semiconductors, while III–V semiconductors, including one of the most important direct band gap semiconductors, GaAs, have not yet been studied in this form because of the numerous difficulties encountered in their preparation., Compared to the I–VII and II–VI semiconductors, the III–Vs have a greater degree of covalent bonding, a less ionic lattice, and larger exciton diameters (the exciton diameter in GaAs is 190 Å, compared to 60 Å for CdS). For this reason, quantum size effect on the optical spectra have been predicted to be more pronounced in the III–V class of materials than in the II–VIs, Brus, L. E., *J. Chem. Phys.* (1983) 79:5566, and crystallites of GaAs are more likely to find application in optical devices than CdS clusters. Schmitt-Rink, S. et al., *Phys. Rev. B* (1987) 5:8113; (9) Miller, D.A.B. et al., *Phys. Rev. B* (1986) 33:6976; *Appl. Phys. Lett.* (1988) 52:2154.

Thus, there is an unfilled need for relatively monodisperse, redissolvable, crystalline, nanometer-size III–V semiconductor particles. Prior methods of producing GaAs have not yielded such products. For example, surface-bound GaAs nanocrystals with broad size distribution have been prepared by molecular beam epitaxy on amorphous silica. Sandroff, C. et al., *Science* (1989) 245:391. Byrne, E. K. et al., *Science* (1988) 241:332, reported a liquid-phase reaction which they said gave gallium arsenide particles, without supporting evidence.

Another preparation method has been recently described by Wells and co-workers. Wells, R. L. et al., *Chem. Mater.* (1989) 1:4; Wells, R. L. et al., *Mater. Res. Soc. Symp. Proc.* (1989) 131:45. The Wells et al. preparation route is based on the finding that $GaCl_3$ and $As(SiMe_3)_3$ react in low-boiling hydrocarbons to give solid products, which on heating afford bulk polycrystalline GaAs. Our X-ray diffraction experiments on the black GaAs powder prepared in this manner show that the domain size is 100 Å.

STATEMENT OF THE INVENTION

We have now found that, in the preparation of III–V compounds by direct reaction of a group III metal source with a group V nonmetal source, the reaction medium employed plays a big part in the III–V crystallite form ultimately obtained. More particularly, we have found that if a crystal growth terminator such as a nitrogen- or phosphorus-containing polar organic solvent is present in place of the pure nonpolar hydrocarbon of the art, one can obtain III–V crystallites which are sized in the range 30–50 Å and which are relatively monodisperse and redissolvable.

Thus, in one aspect the present invention provides III–V semiconductors in this new and desirable nanocrystal form.

In another aspect the invention provides a new method for producing III–V semiconductor nanocrystals. The method involves the steps of a) reacting a group III metal ion source with a group V nonmetal source in liquid reaction substrate including a crystal growth terminator, thereby forming a III–V compound containing liquid-substrated reaction product, and thereafter b) removing the liquid substrate from the reaction product. This yields the nanometer crystallite as a solid. This product is readily redissolvable. It also can be heat-annealed to increase its crystallinity.

DETAILED DESCRIPTION OF THE INVENTION

Brief Description of the Drawing

The invention will be further described with reference being made to the drawings in which.

DESCRIPTION OF PREFERRED EMBODIMENTS

The Semiconductor Nanocrystals

Figure 1:
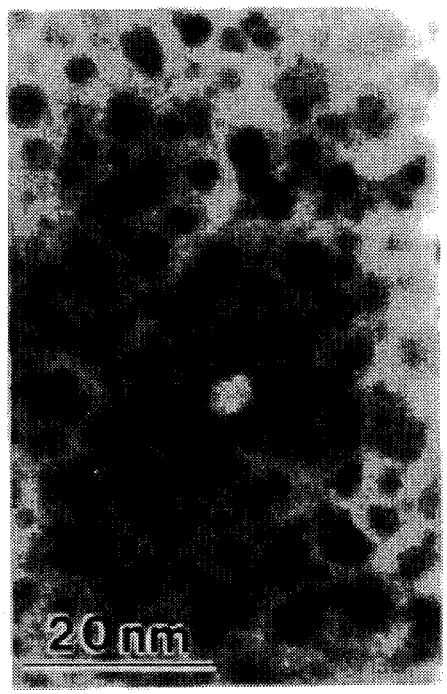
FIG. 1 is a transmission electron micrograph from a field of GaAs particles showing an average particle size of 45 Å by 35 Å.

This invention provides a method for forming nanocrystals of semiconducting compounds. It finds application with III–V semiconducting compounds such as GaAs, GaP, GaAs-P, GaSb, InAs, InP, InSb, AlAs, AlP, and AlSb. These compounds and their applications in solid state electronic devices are well known.

The semiconductor crystallites provided by the invention are characterized by a uniform nanometer size. By "nanometer size" is meant a size less than 100 Å. Preferred crystallite sizes range from about 1 to about 6 nanometers and particularly 1 to about 5 nanometers, as determined by direct electron microscope measurement. In this size range, the particles are also characterized by exhibiting quantum confinement. The particles are also characterized as being relatively monodisperse—that is, at least about 50%, preferably at least 75%, and more preferably at least 85% of them fall within the size limits set forth above. The crystallites having these properties are referred to as nanocrystals.

The nanocrystals dissolve in polar organic solvents, such as quinoline or pyridine. When the particles of this invention are subjected to elemental analysis, the ratio of metal to nonmetal is about 1:1, i.e., from about 1:1 to about 4:3 and often about 5:4.

The Preparation Process

Aspects of this process are shown in our publication (with A. N. Goldstein) appearing at *J. Am. Chem. Soc.* (December, 1990) 112:9438.

The process of this invention is illustrated with reference made to the preparation of gallium arsenide (GaAs) nanocrystals. While this is a preferred embodiment, the process there depicted could be used to make any of the above-described materials. A gallium source ($GaX_3$) is combined in approximately equimolar ratio with an arsenic source, $AsY_3$. These materials are heated together in a liquid-phase reaction medium. If the liquid-phase reaction medium does not contain a crystallite growth terminator, the result is as shown in the upper arrow. Gallium arsenide is formed as a polycrystalline large particle.

In accord with the present invention, the two starting materials are heated together in liquid phase in the presence of a crystallite growth terminator ("T" in the diagram). The crystallite growth terminator has the effect of halting crystallite growth when the crystallites reach a size of 10–100 Å. These crystallite growth terminator materials are believed to bind to the surface of the crystallites, as shown in the diagram, and prevent further growth of the crystallite and/or prevent aggregation of the crystallites.

A distinguishing feature of the preparation process is that it is carried out in a liquid reaction phase which includes at least one of these crystallite growth terminators. Crystallite growth terminators can include compounds which include a phosphorus or nitrogen having an unshared pair of electrons. This unshared pair can complex with the metal and bind to it, thereby presenting a surface which will prevent further crystal growth. Examples of suitable nitrogen-containing materials are nitrogen-containing aromatic heterocyclics such as pyridine, quinoline, pyrimidine, imidazole and the purines and benzimidazoles, as well as 2-methylpyridine, 3-ethylpyridine, 4-chloropyridine, collidine, dimethylquinoline, and the like.

Phosphorus-containing materials can include phosphines including phosphine itself, alkylphosphines, dialkylphosphines and trialkylphosphines, phosphites, and the like. Examples of these phosphorus compounds include phosphine, mono-, di- and tri-($C_{1-6}$alkyl)phosphine, such as $PH_2CH_3$, $PH(CH_3)_2$, $P(CH_3)_3$, $PH_2(C_4H_9)$, $PH(C_5H_{11})_2$ and $P(C_6H_{13})_3$; and $C_{1-6}$alkylphosphites such as P—$(OCH_3)_3$, P—$(OC_2H_5)_3$ and P—$(OC_3H_7)_3$.

Another type of crystal growth terminator can be a substituted version of one of the two feed materials which leads to the generation of T-groups on the surface. An example of this would be a diphenyltri$C_1$–$C_6$silylarsine as an arsenate source. If this group is incorporated into a crystal, it presents, as an outside surface, the phenyl groups, which would then prevent further crystal growth. Other equivalent materials include diphenylphosphines, diphenylstibines, dialkylarsines, and the like.

Examples of these materials include diphenyltrimethylsilylphosphine, diphenyltriethylsilyl phosphine, diphenyltriisopropylsilylarsine, diphenyl triethylsilylstibine and diphenyltrihexylsilylstibine.

The crystal growth terminator should be present in a liquid reaction medium. Many of the materials described above themselves are liquids and can serve as reaction medium. Typically, the crystal growth terminator should constitute at least about 5% and preferably at least about 10%, up to in some cases 100%, of the liquid reaction medium. The liquid reaction medium should be a nonwater material. It should be aprotic. It can be a hydrocarbon, for example an alkane of 6 to 20 carbons or the like; it could be aromatic; it could be a mixed hydrocarbon fraction. It could contain nitrogen, it could contain phosphorus, it could be an ether—so long as it is compatible with the feed materials and with the crystal growth terminator. Representative solvents include the alkanes hexane, decane and hexadecane, aromatics including benzene and naphthalene, and alkaromatics of from about 6 carbons to about 20 carbons such as toluene, xylene and the like.

In this process, a group III metal source, such as a GaIII salt, InIII salt, or AlIII salt, especially halide, or corresponding metal 1–6 carbon trialkyls, is reacted directly with an arsenic, phosphorus, or antimony source such as arsine, phosphine, or stibine; an alkyl arsine, phosphine or stibine; or an alkyl silyl arsine, phosphine or stibine in liquid phase at an elevated temperature. Representative metal sources include $GaCl_3$, $GaBr_3$, $GaI_3$, $InCl_3$, $InBr_3$, $AlCl_3$, $Ga(Me)_3$, $Ga(Et)_3$, $Ga(Bu)_3$, or the like. Representative arsenic, phosphorus and selenium sources include $ASH_3$, $PH_3$, $SeH_3$, $AsH_2$(1–6 carbon alkyl), As(1–4 carbon alkyl)$_3$, P(1–4 carbon alkyl)$_3$, As(Si(1–6 carbon alkyl)$_3$)$_3$, P(Si(1–6 carbon alkyl)$_3$)$_3$, Se(Si(1–4 carbon alkyl)$_3$)$_3$ and the like.

These materials are described in the literature. Mixtures of two or more gallium salts or of two or more arsines may be used if desired, but are not seen to offer any particular advantage at this time.

One or more of each of these two groups of materials are mixed together in the nonaqueous liquid reaction medium which includes the crystal growth terminator and heated to a temperature of at least about 100° C. for a prolonged period of at least about 1 hour. Water and air should be excluded from the reaction zone. This causes the desired nanocrystals to form. The reaction medium can then be removed to yield the nanocrystals in dry form.

The reaction can be carried out in the polar organic reaction medium at a 1:1 molar ratio of gallium salt to arsine. This ratio can be varied such as from 1:1.5 to 1.5 to 1 without departing from the spirit of this invention. The reaction is best carried out in the substantial absence of added water.

The concentration of reactants in the reaction medium does not appear to be critical to the success of the reaction and can range from about 0.1 molar (basis gallium salt) to about 0.5 molar. Good results are obtained in the 0.15 to 0.35 molar range, although higher and lower concentrations can be used.

The reaction between the gallium salt and arsine requires an elevated temperature and takes a prolonged period to complete. The reflux temperature of the reaction medium can be used, if convenient. Elevated pressures of up to 50 or 100 atmospheres can be used to obtain higher temperatures. Suitable temperatures range from about 100° C. to about 400° C. although higher temperatures such as up to about 500° C. can also be used. At 240–250° C. reaction times of 24 to 100 hours are employed. At 200° C. the reaction times would be 2 to 8 times longer, while at 280° to 300° C. the reaction could be completed in from 2 to 30 hours, and in one to 20 hours at 350°–400° C.

The reaction zone can be agitated by reflux or by a stirrer, if desired.

The product of the reaction is a nanocrystal powder which can be isolated by simply removing the reaction medium. This is carried out by evaporation, filtration and the like.

In an optional additional step the crystallites of the invention are flame-annealed. This is carried out on the dry crystallites at a temperature of from about 400° C. to 550° C. in a vacuum for a brief period of from a few (10) seconds to up to about 10 minutes.

The products of this invention are III–V semiconductors and find application where GaAs semiconductors are used.

This invention will be further described by the following Examples. These Examples are not to be construed as limiting the scope of this invention, which is defined by the appended claims.

Example 1

GaCl$_3$ (99.99%) was purchased from Aldrich, purified by sublimation, and stored in a dry box. Tris(trimethylsilyl)arsine was prepared according to literature methods, Becker, G. et al., *Anorg. Allg. Chem.* (1980) 462:113, purified by vacuum distillation, and stored in a dry box at 0° C. Proton NMR and infrared spectra matched the literature values. Tris(trimethylsilyl)arsine: IR (neat liquid) 2892 (m), 2890 (s), 2828 (s), 2816 (s), 2785 (vs), 1446 (s), 1400 (vs), 1306 (s), 1259 (vs), 1240 (w), 1124 (m), 869 (w), $^1$H NMR (300 MHz, C$_6$D$_6$) δ0.35 (s, SiMe3). Quinoline was purchased from Aldrich and distilled immediately prior to use. Quinoline (25 mL) containing 6.5×10$^{-3}$ mol of tris(trimethylsilyl)arsine was added to 6.5×10$^{-3}$ mol of GaCl$_3$ in 25 mL of quinoline, which served as reaction medium and as crystallite growth terminator. The resulting mixture was heated at reflux (240° C.) for 3 days. A red powder was isolated by removal of the solvent, and the powder consisted of GaAs particles which are redissolvable in pyridine or quinoline. Flame annealing of the powder under vacuum at 450° C. improved the crystallinity of the particles, but resulted in loss of solubility.

Figure 2:
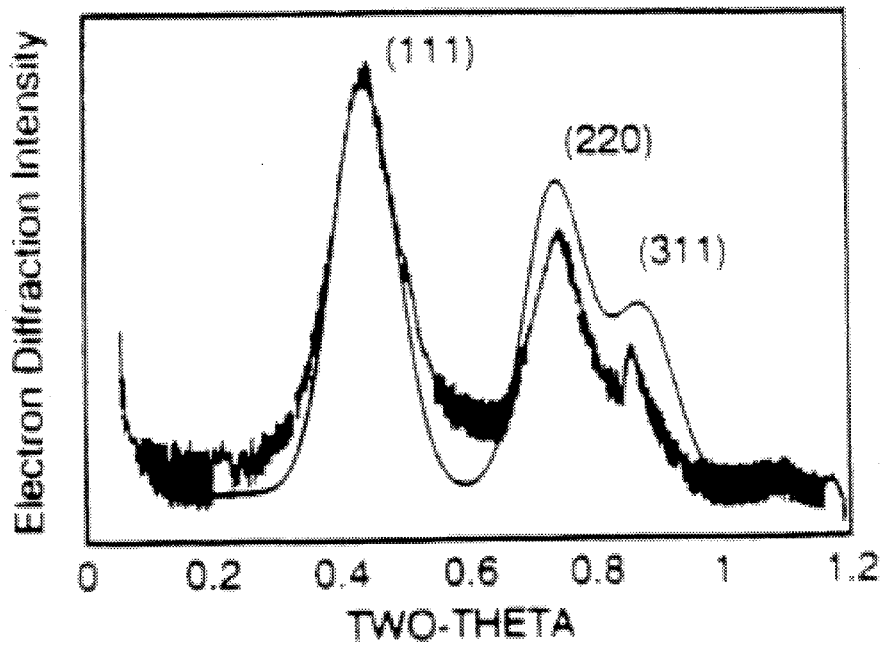
FIG. 2 is an electron diffraction pattern from the particles shown in FIG. 1 from which a domain size of 24 Å is determined using the Debye-Scherrer formula.
Figure 3:
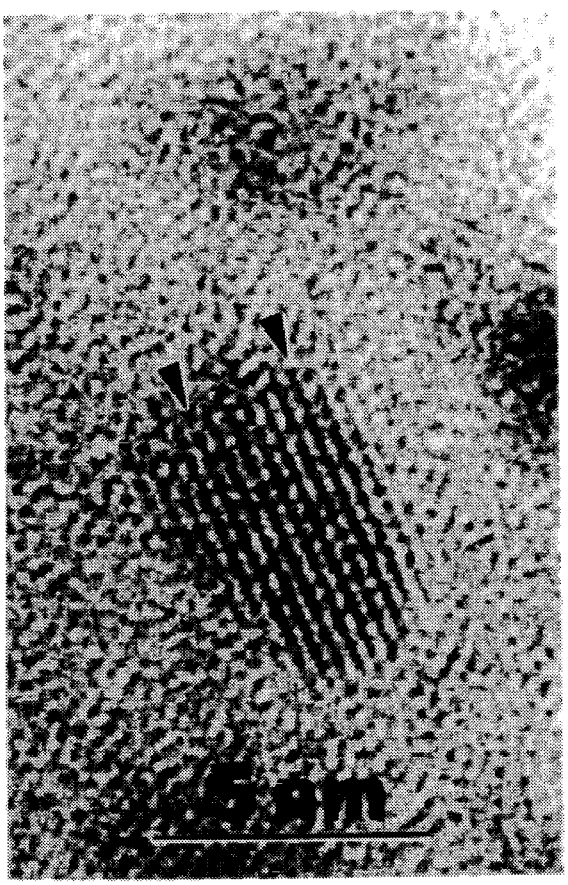
FIG. 3 is a transmission electron micrograph of a single GaAs particle showing lattice planes.
Figure 4:
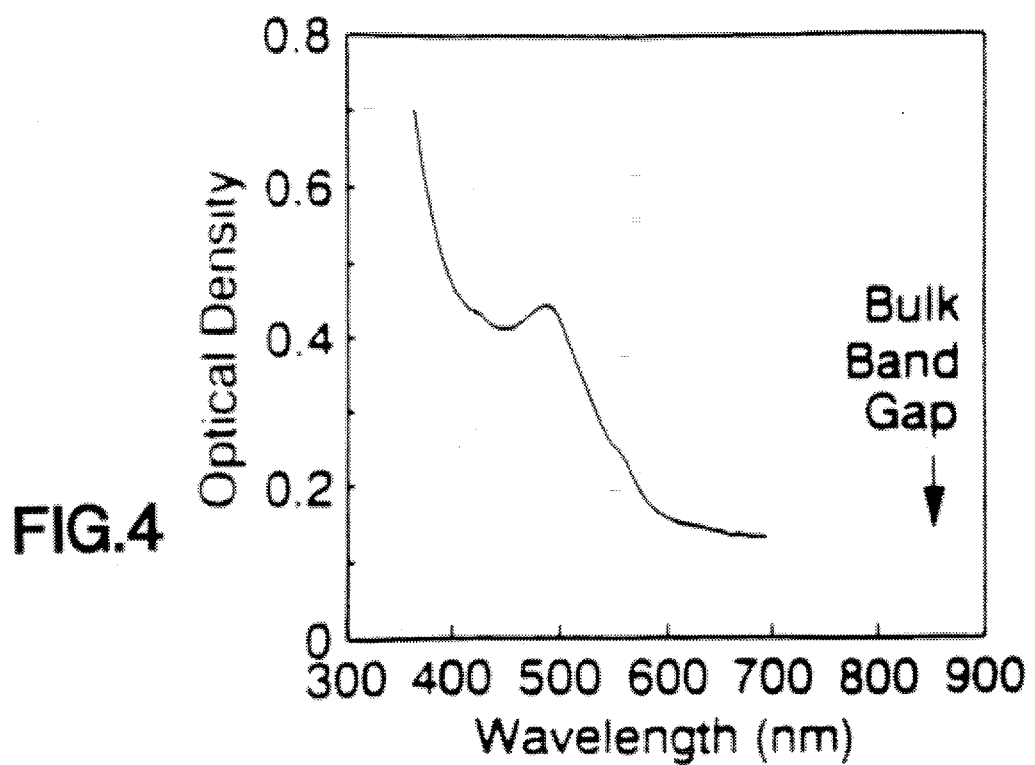
FIG. 4 is an optical absorption spectrum of a quinoline solution of GaAs nanocrystals of this invention.

The quinoline-soluble GaAs particles were studied by TEM. The particles were deposited from solution onto an amorphous carbon overlayer on a Cu grid and were imaged on a JEOL 200cx microscope operating at an accelerating voltage of 200 kV. TEM revealed prolate GaAs particles with an average major axis of 45 Å and minor axes of 35 Å (FIG. 1; the bar is 20 nm). The size distribution of ±10% variation of each axis was broad compared to that of the best II–VI nanocrystal preparations. FIG. 3 shows a transmission electron micrograph of one GaAs particle taken from the field of FIG. 1, in which lattice planes can clearly be seen. In FIG. 3, the bar is 5 nm. Selected area electron diffraction on this region of the grid yields a diffraction pattern in which the (111), (220), and (311) zincblende peaks of GaAs are evident, confirming the identity of the particles (FIG. 2). The widths of these peaks can be used to determine the domain size of the particles via the Debye-Scherrer formula:

$$\Delta(2\Theta) = \frac{1.2\lambda}{D \cos \Theta} \quad (1)$$

where λ is the electron wavelength and D is the crystallite diameter. The best fit was obtained for D=24 Å. Since the domain size determined by electron diffraction is somewhat smaller than the mean particle diameter from the real space images, we concluded that the particles are not perfectly crystalline.

X-ray diffraction on the unflamed and flamed powders also showed the (111), (220), and (311) peaks of GaAs. The domain size from X-ray diffraction matched the value obtained from electron diffraction on the unflamed powder, although the signal-to-noise ratio was much worse. The domain size was 30 Å in the flamed sample, but this improvement in crystallinity was obtained by compromising the solubility. Elemental analysis of the particles showed the presence of Ga and As in a 5:4 ratio, as well as carbon and nitrogen. These numbers were verified by XPS studies of the Ga and As core levels. The carbon and nitrogen may be from quinoline, which could bind to the Ga-rich surface via the nitrogen lone pair, and act as a capping moiety. Steigerwald, M. L. et al., *J. Am. Chem. Soc.* (1988) 110:3046. Resonance Raman scattering on powders prepared in this manner showed a single peak at 292 cm$^{-1}$ the frequency of the LO mode of GaAs.

Example 2

The preparation of Example 1 is repeated using a corresponding phosphine, tris(trimethylsilyl)phosphine, in place of the arsine of Example 1. This leads to GaP nanocrystals as the product.

Example 3

The preparation of Example 1 is repeated using InCl$_3$ as a starting material in place of GaCl$_3$. This leads to InAs nanocrystals as the product.

Example 4

The preparation of Example 1 is repeated with the changes that pyridine is used as reaction medium, a pressure vessel is used, the reaction temperature is 300° C., and the reaction time is 20 hours. An equivalent GaAs nanocrystal product is obtained.

Example 5

Example 4 is repeated using a 25%/75% mixture of pyridine and a high-boiling petroleum distillate fraction as reaction medium. Equivalent results are obtained.

Example 6

Example 4 is repeated using a 15%/85% mixture of tributylphosphine and a high-boiling petroleum distillate fraction as reaction medium. Equivalent results are obtained.

What is claimed is:

1. Particles of III–V semiconductor, said particles being crystalline, being soluble in quinoline or pyridine, and being sized such that at least about 50% are between 1 nanometer and 6 nanometers across.

2. The particles of claim 1 wherein the III–V semiconductor is GaAs.

3. The particles of claim 1 wherein the III–V semiconductor is GaP.

4. The particles of claim 1 wherein the III–V semiconductor is GaAs—P.

5. The particles of claim 1 wherein the III–V semiconductor is GaSb.

6. The particles of claim 1 wherein the III–V semiconductor is InAs.

7. The particles of claim 1 wherein the III–V semiconductor is InP.

8. The particles of claim 1 wherein the III–V semiconductor is InSb.

9. The particles of claim 1 wherein the III–V semiconductor is AlAs.

10. The particles of claim 1 wherein the III–V semiconductor is AlP.

11. The particles of claim 1 wherein the III–V semiconductor is AlSb.

12. A process for forming particles of a III–V semiconductor comprising
   a) reacting, in a nonwater reaction medium comprising a nitrogen-containing aromatic heterocyclic material, a reaction medium-soluble group III metal source with a reaction medium-soluble group V nonmetal source at a temperature above 100°,
   b) removing the reaction medium thereby forming a reaction product comprising particles of III–V semiconductor, and
   c) recovering the particles.

13. The process of claim 12 wherein the nitrogen-containing aromatic heterocyclic material is a liquid.

14. The process of claim 13 wherein the nitrogen-containing aromatic heterocyclic liquid material is quinoline.

15. The process of claim 13 wherein the nitrogen-containing aromatic heterocyclic liquid material is pyridine.

16. The process of claim 12 wherein the group III metal source is a group III metal salt or alkyl.

17. The process of claim 16 wherein the group III metal is gallium.

18. The process of claim 17 wherein the gallium source is a gallium III halide.

19. The process of claim 18 wherein the gallium III halide is $GaCl_3$.

20. The process of claim 17 wherein the nitrogen-containing aromatic heterocyclic material is a liquid.

21. The process of claim 20 wherein the nitrogen-containing aromatic heterocyclic liquid material is quinoline.

22. The process of claim 12 wherein the group V nonmetal source is selected from the group consisting of arsine, phosphine, stibine, trialkylarsine, trialkyphosphine, trialkylstibine, tris(tri-$C_1C_6$ alkylsylyl) arsine, tris(tri-$C_1$-$C_6$ alkylsilyl phosphine and tris(tri-$C_1$-$C_6$alkylsilyl) stibine.

23. The process of claim 12 wherein the group V nonmetal source is tris(tri-$C_1$-$C_6$ alkyl-silyl)arsine.

24. The process of claim 23 wherein the group V nonmetal source is tris(trimethylsilyl)arsine.

25. A process for preparing particles of gallium arsenide comprising the steps of
   (a) reacting gallium chloride with tri(trimethylsilyl)arsine in an about 1:1 molar ratio in a quinoline reaction phase at a temperature of from 200°–300° C. thereby forming a GaAs-containing reaction product, and
   (b) removing the quinoline from the reaction product thereby yielding GaAs particles as a dry red powder.

* * * * *